No. 791,630.  
Patented June 6, 1905.

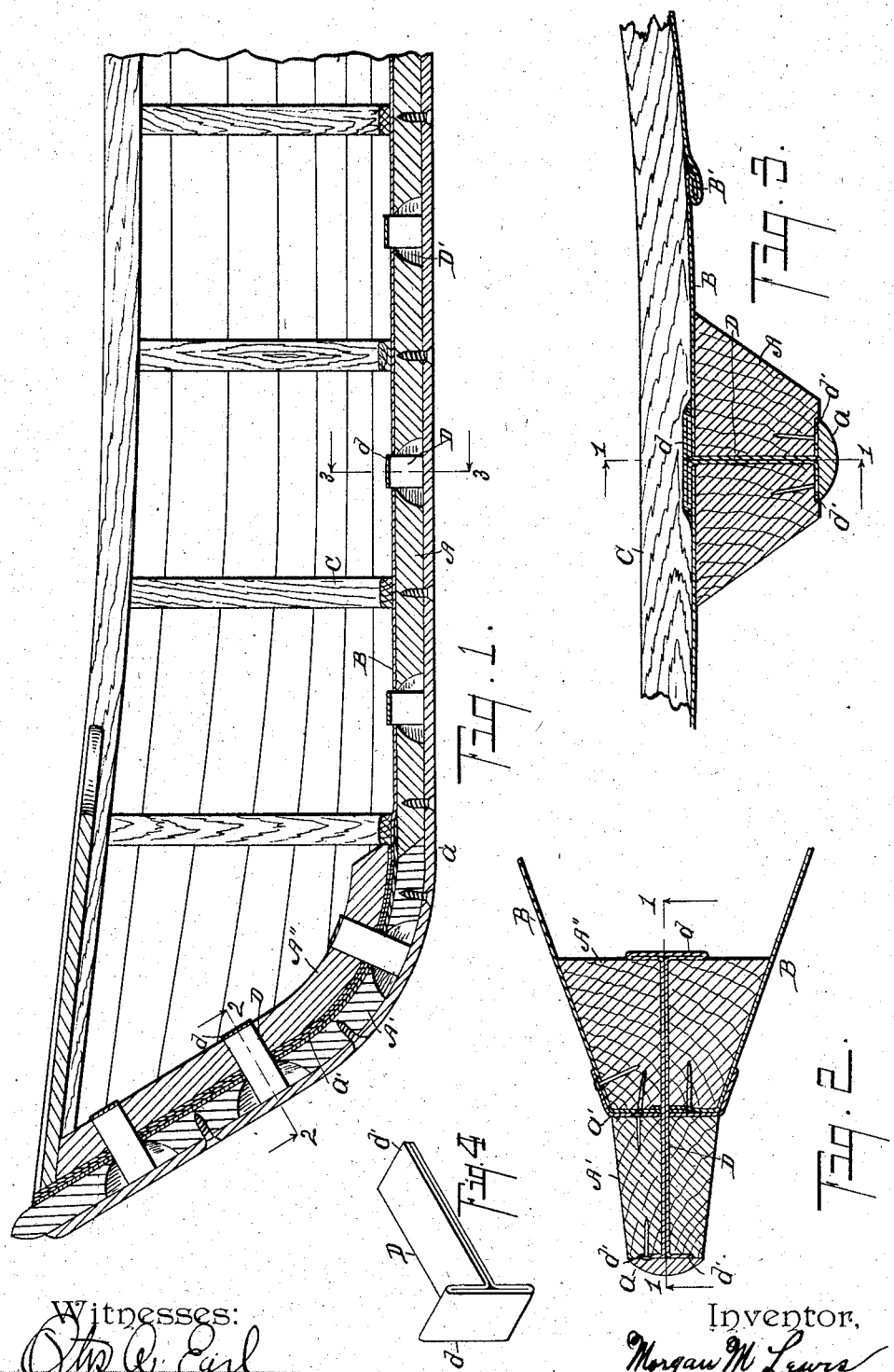

UNITED STATES PATENT OFFICE.

MORGAN M. LEWIS, OF BATTLECREEK, MICHIGAN, ASSIGNOR OF TWO-THIRDS TO HARRY P. LEWIS AND SYRA E. LEWIS, OF BATTLECREEK, MICHIGAN.

BOAT.

SPECIFICATION forming part of Letters Patent No. 791,630, dated June 6, 1905.

Application filed July 30, 1904. Serial No. 218,892.

*To all whom it may concern:*

Be it known that I, MORGAN M. LEWIS, a citizen of the United States, residing at the city of Battlecreek, county of Calhoun, State of Michigan, have invented certain new and useful Improvements in Boats, of which the following is a specification.

This invention relates to improvements in boats.

It relates particularly to improvements in boats having a sheet-metal skin or shell.

The objects of this invention are, first, to provide an improved boat having a sheet-metal skin or shell which is economical to produce and strong and durable; second, to provide in a boat having a sheet-metal skin or shell an improved keel and means for securing the same in position; third, to provide an improved boat having a sheet-metal skin in which packings or gaskets are dispensed with.

Further objects and objects relating to structural details will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawings, forming a part of this specification, in which—

Figure 1 is a detail longitudinal sectional view of my improved boat, taken on a line corresponding to line 1 1 of Figs. 2 and 3. Fig. 2 is an enlarged detail sectional view taken on a line corresponding to line 2 2 of Fig. 1. Fig. 3 is an enlarged detail sectional view taken on a line corresponding to line 3 3 of Fig. 1. Fig. 4 is an enlarged perspective view of one of the fasteners D.

In the drawings the sectional views are taken looking in the direction of the little arrows at the ends of the section-lines, and similar letters of reference refer to similar parts throughout the several views.

Referring to the drawings, A is the keel of a boat, B the shell or skin, and C the ribs. The skin B is made of strips of sheet metal, which are preferably joined together by double seams B'. The keel is secured to the skin by fasteners D, which are inserted through slot-like holes in the skin and keel. The fasteners D are made up of strips of sheet metal, which are folded inwardly to form a head $d$, and the ends $d'$ are brought together to form the shaft of the fastener. (See Fig. 4.) After inserting through the skin and keel from the inside the ends of the shank are spread laterally upon the bottom of the keel and secured by brads or nails driven therethrough into the keel. The slots D' in the keel are then filled in with solder around the fasteners. The head of the fastener is also soldered to form a perfectly water-tight joint. (See Figs. 1 and 3.) The bow or bow extension of the keel is made up of an outer bow-piece A' and an inner bow-piece A''. The ends of the strips forming the shell are lapped upon the forward edge of the inner bow-piece A'' and secured thereto by brads or nails. (See Fig. 2.) These overlapping joints are then preferably given a wash of solder to make the same perfectly water-tight. The outer bow-piece or keel extension A', which corresponds in shape with the inner bow-piece A'', is provided with a trough $a'$, of sheet metal, on its inner edge, adapted to fit over the inner bow-piece, with the shell or skin strip secured thereto, as described. The outer bow-piece or keel extension A' is secured in position by nails or brads, which are driven through the sides of the trough $a'$ into the inner bow-piece A'', and also by the fasteners D, which are arranged therethrough and through the inner bow-piece, as clearly appears in Figs. 1 and 2. The union of the sides of the trough to the skin may be made water-tight by soldering. A metal shoe $a$, which is common to the keel and its bow and stern extensions, is then secured in place by suitable screws. This shoe covers the ends $d'$ of the fasteners and prevents the loosening of the retaining-nails. It would also hold the fasteners quite securely if the nails were to be omitted.

As the stern of the boat is constructed in substantially the same manner as the bow of the boat, it is not here illustrated.

By the means I have pointed out the keel is secured to the skin of the boat in a very strong and rigid manner and the fastenings are so arranged that they are not liable to corrode and form leaks. This is also true of the bow-pieces. When the parts are secured as I have described, they are not likely to become loosened by shrinking and swelling of the wood parts. The wood parts are not weakened, as would occur if holes were bored through the same to receive bolts of sufficient size to meet the required strain, and the necessity for any rubber or other gaskets or packings is entirely overcome.

The fastenings D may be made up of pieces of waste material, which is a considerable item in the reduction of the expense of manufacture. The fasteners have large flat heads, so that they are not liable to pull through the skin.

I have illustrated my improved boat in detail in the form preferred by me on account of its structural simplicity and economy. I am aware, however, that it is capable of considerable variation in structural details without departing from my invention.

Having thus described my invention, what I claim as new, and desire to secure by Letters Patent, is—

1. In a boat, the combination of a skin made of longitudinal strips of sheet metal, suitably seamed together; a keel arranged on the outside of said skin; an inner end piece to which the ends of said longitudinal strips are secured by overlapping thereon, and nailing; an outer end piece having a sheet-metal trough on its rear edge, fitted over said inner end piece and secured thereto by nailing through the sides of said trough; fasteners consisting of pieces of sheet metal folded to form heads, and the ends brought together to form shafts, which shafts are arranged through suitable slits and spread laterally and secured by nailing therethrough; and a metal shoe common to said keel and end pieces, secured thereto, for the purpose specified.

2. In a boat, the combination of a skin made of longitudinal strips of sheet metal, suitably seamed together; a keel arranged on the outside of said skin; an inner end piece to which the ends of said longitudinal strips are secured by overlapping thereon, and nailing; an outer end piece having a sheet-metal trough on its rear edge, fitted over said inner end piece and secured thereto by nailing through the sides of said trough; and fasteners consisting of pieces of sheet metal folded to form heads, and the ends brought together to form shafts, which shafts are arranged through suitable slits and spread laterally and secured by nailing therethrough, for the purpose specified.

3. In a boat, the combination of a skin made of longitudinal strips of sheet metal, suitably seamed together; an inner end piece to which the ends of said longitudinal strips are secured by overlapping thereon, and nailing; an outer end piece having a sheet-metal trough on its rear edge, fitted over said inner end piece and secured thereto by nailing through the sides of said trough; fasteners consisting of pieces of sheet metal folded to form heads, and the ends brought together to form shafts, which shafts are arranged through suitable slits and spread laterally and secured by nailing therethrough, for the purpose specified.

4. In a boat, the combination of a skin made of longitudinal strips of sheet metal, suitably seamed together; an inner end piece to which the ends of said longitudinal strips are secured by overlapping, thereon, and nailing; and an outer end piece having a sheet-metal trough on its rear edge, fitted over said inner end piece and secured thereto by nailing through the sides of said trough, for the purpose specified.

5. In a boat, the combination of a skin of sheet metal; a keel or the like arranged on the outside of said skin; fasteners consisting of pieces of sheet metal folded to form heads, and the ends brought together to form shafts, which shafts are arranged through suitable slits in said skin and keel from the inside, and their ends spread laterally upon said keel and secured thereto by nailing therethrough; and a metal shoe secured over the ends of said fasteners, for the purpose specified.

6. In a boat, the combination of a skin of sheet metal; a keel or the like arranged on the outside of said skin; fasteners consisting of pieces of sheet metal folded to form heads, and the ends brought together to form shafts, which shafts are arranged through suitable slits in said skin and keel from the inside and their ends spread laterally upon said keel; and a metal shoe secured over the ends of said fasteners, for the purpose specified.

7. In a boat, the combination of a skin of sheet metal; a keel or the like arranged on the outside of said skin; and fasteners consisting of pieces of sheet metal folded to form heads, and the ends brought together to form shafts, which shafts are arranged through suitable slits in said skin and keel from the inside, and their ends spread laterally upon said keel and secured thereto by nailing therethrough, for the purpose specified.

In witness whereof I have hereunto set my hand and seal in the presence of two witnesses.

MORGAN M. LEWIS. [L. S.]

Witnesses:
   DANIEL McCAWLY,
   BEMIE R. BROWN.